March 25, 1969 W. E. PFEIFFER 3,435,247

BATCH TIMER

Filed Dec. 7, 1967

INVENTOR
WILLIAM E. PFEIFFER
BY
Hood, Gust & Irish
ATTORNEYS

United States Patent Office 3,435,247
Patented Mar. 25, 1969

3,435,247
BATCH TIMER
William E. Pfeiffer, Indianapolis, Ind., assignor to Farm Fans, Inc., Indianapolis, Ind., a corporation of Indiana
Filed Dec. 7, 1967, Ser. No. 688,790
Int. Cl. H02j 1/00, 3/00, 3/14
U.S. Cl. 307—38                                   11 Claims

ABSTRACT OF THE DISCLOSURE

A control system comprising first and second control means and first and second timer means, the first timer means being arranged to energize the first and second control means for a predetermined time and, then, to energize the second timer means, the second timer means being arranged to maintain the second control means energized for a second predetermined period of time. A switch is operatively connected to the second control means and arranged to energize and advance the timer means when said second control means is energized.

BACKGROUND OF THE INVENTION

Field of the invention

The present invention relates to timers, and more particularly to the provision of a control system embodying a pair of timers operatively arranged to control a pair of associated operating devices, such as a heater and a blower.

SUMMARY OF THE INVENTION

The present invention is a control system ideally suited for controlling a heater and its associated blower so that the heater is operated for a first predetermined time and so that the blower is operated for a second predetermined time which begins at the end of the first predetermined time. Specifically, the control system of the present invention is ideally suited for controlling the operation of a grain-drying system comprising a gas-fired burner and a blower associated therewith. Usually, in such a grain-drying system, the burner and blower are operated for a predetermined time to supply hot, dry air to the grain and then the blower is operated without the burner for a second predetermined time to cool the grain. It will be apparent, however, that the control system of the present invention is not limited to grain-drying applications.

The control system comprises a first control means, second control means, first timer means, and second timer means. In the preferred embodiment, the first timer means comprises first, second, third and fourth switches, and the second timer means comprises fifth and sixth switches. The first switch is effective to energize and advance the first timer means when the first switch is closed; the second switch is effective to energize the first control means when the second switch is closed; the third switch is effective to energize the second control means when the third switch is closed; the fourth and fifth switches are effective to energize and advance the second timer when both the fourth and fifth switches are closed, the fourth and fifth switches being in series; and the sixth switch is effective to energize the second control means when the sixth switch is closed. The control system further comprises a seventh switch operatively connected to the second control means and arranged to be closed when the second control means is energized, the seventh switch being in series with the first switch to maintain the first timer means energized when both the first and seventh switches are closed and in series with the fourth and fifth switches to maintain the second timer means energized when the fourth, fifth and seventh switches are closed.

In the illustrative embodiment of the present invention, the first control means is a solenoid-operated valve for energizing and deenergizing a gas burner and the second control means is a solenoid-operated switch means for energizing and deenergizing a blower which is associated with the gas burner.

It will be apparent, as this description progresses, that the first and second timer means are integrated with the second control means through the aforementioned seventh switch which is opened and closed by the operation of the second control means. Specifically, the first and second timer means are maintained energized through the seventh switch once the control system is operated and the second control means is energized. Preferably, a manually-operable, normally-open switch is provided for momentarily energizing the second control means, thereby to energize and advance the timer means.

Generally speaking, therefore, the control system comprises first circuit means for connecting one side of the seventh switch to one side of an electrical power source and second circuit means for connecting the other side of the seventh switch to the second control means and through the second control means to the other side of such power source, the second circuit means including switches operated by the first and second timers.

It is an object of the present invention, therefore, to provide a pair of control devices, such as a solenoid-operated valve and a solenoid-operated switch, and a pair of timers arranged to energize and deenergize the control devices at selected predetermined times.

Another object of the present invention is to provide such a control system wherein both of the timers are energized through a switch which is maintained closed by one of the control devices when the control device is energized.

The above-mentioned and other features and objects of this invention and the manner of attaining them will become more apparent and the invention itself will be best understood by reference to the following description of an embodiment of the invention taken in conjunction with the accompanying drawings wherein:

DESCRIPTION OF THE PREFERRED EMBODIMENT

Figure 1:
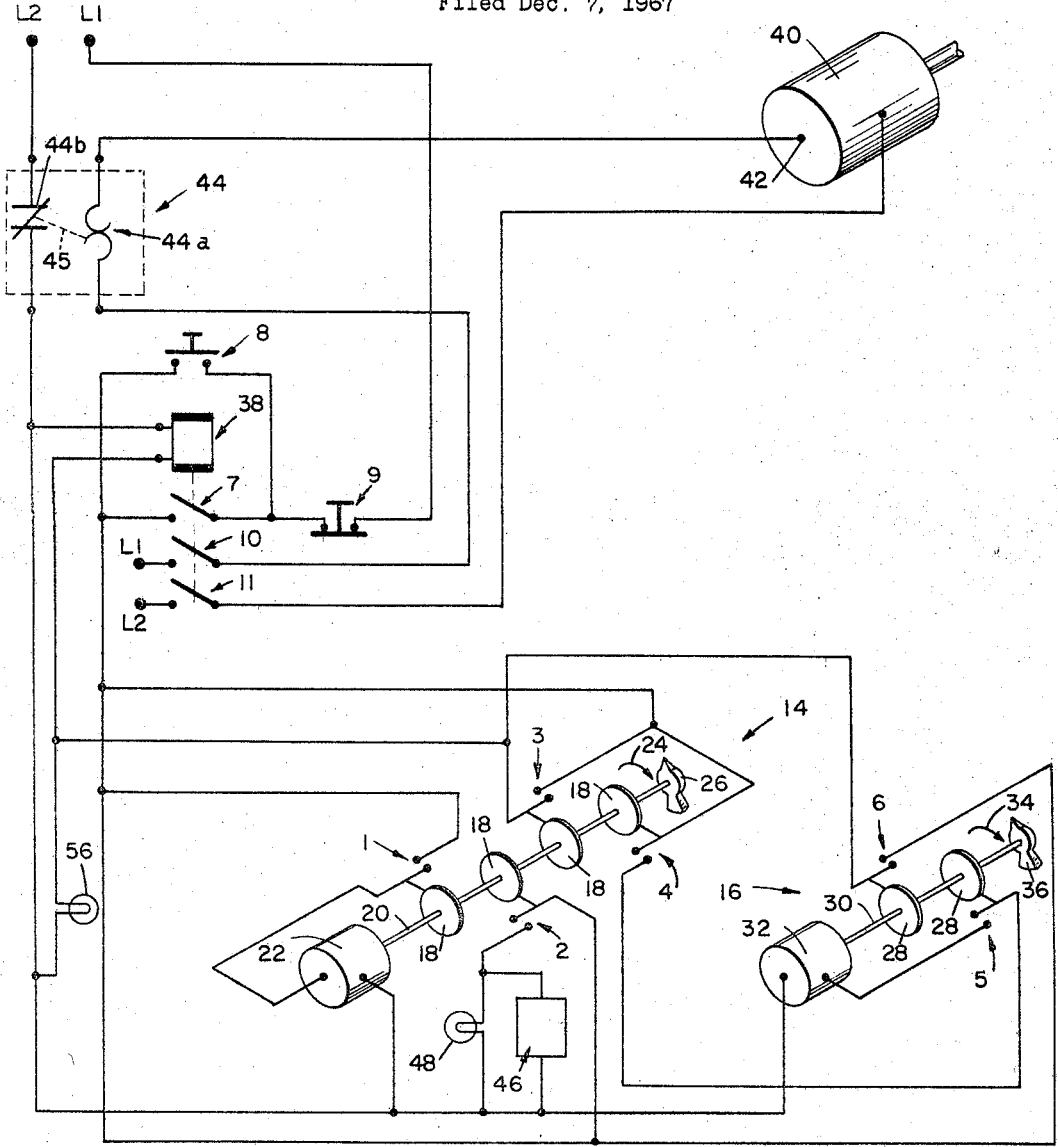
FIG. 1 is a schematic diagram of the control system of the present invention.

Referring to FIG. 1, it will be seen that there is illustrated switches 1–11, each switch being indicated generally by its respective reference numeral. Switches 1 through 4 comprise the output switches operated by the first timer, indicated generally by the reference numeral 14, and the switches 5 and 6 comprise the output switches operated by the second timer, indicated generally by the reference numeral 16.

In the illustrative embodiment, each of the switches 1–4 is associated with a cam 18 mounted on a shaft 20 for rotation therewith, the shaft 20 being drivingly connected to a constant-speed timer motor 22. The motor 22 advances the cams 18 at a constant rate of speed in the direction of the arrow 24, and, in a conventional manner, the contour of each cam 18 is arranged to open and close its associated switch 1, 2, 3, 4 at the appropriate time. Preferably, a pointer knob 26 is mounted on the shaft 20 to facilitate the manual positioning of the shaft 20 and cams 18. When the shaft 20 is positioned at a preselected starting point, i.e., the point at which each of the switches 1, 2, 3, 4 is either opened or closed as desired, and the motor 22 is energized, the shaft 20 will be rotated in the direction of the arrow 24 as the timer 14 times out.

Further, in the illustrative embodiment, each switch 5, 6 is operated by a cam 28 mounted on a shaft 30 for rotation therewith, the shaft 30 being drivingly connected to a constant-speed timer motor 32 arranged to rotate the shaft 30 in the direction of the arrow 34. A pointer knob 36 is mounted on the shaft 30 to provide means for manually adjusting the position of the shaft 30.

Timers of the type just described are well known and need not be discussed, in detail, in this description. In this specification, therefore, the term "timer means" is intended to include any means comprising a plurality of switches and means for opening and closing the switches as the timer means is advanced from the beginning of its cycle to the end of its cycle.

The switches 7, 10 and 11 are operated by a solenoid indicated generally by the reference numeral 38. The switch 8, which is a normally-open, manually-operable switch, preferably of the push-button type, is connected in parallel with the switch 7 as illustrated. The switch 9, which is a normally-closed, manually-operable switch, also preferably of the push-button type, is connected in series with the switch 7 and between the switch 7 and a terminal designated as L1 which is to be connected to one side of a conventional alternating current power source. There is a pair of terminals designated as L1 to simplify the schematic diagram. Likewise, there is a pair of terminals designated as L2, these terminals L2 being provided for connection to the opposite side of such alternating current power source.

The switches 10 and 11 are arranged to connect a conventional blower motor 40 across the power source (terminals L1, L2) when the switches are closed by the solenoid 38. One side of the line connected to the motor 40, i.e., the line between the switch 10 and the terminal 42, is connected through a conventional over-load relay indicated generally by the reference numeral 44, which is arranged to deenergize the motor 40 and the entire control system when the motor 40 is subjected to an over-load condition. In the illustrative embodiment, the over-load relay 44 comprises the bimetal contacts 44a which are operatively connected to the contacts 44b by the link 45 so that, when the motor 40 is subjected to an over-load condition, the bimetal contacts 44a will open and will open the contacts 44b.

The switch 7 is connected in series with the switch 1 so that, when the switches 1 and 7 are closed, the timer motor 22 is energized, i.e., current can flow from the terminal L1 through the switch 9, switch 7, switch 1, the motor 22 and the contacts 44b to the terminal L2. The switch 7 is also in series with the switch 4 and the switch 5 so that, when the switches 4, 5 and 7 are closed, current can flow from the terminal L1 through the switch 9, switch 7, switch 4, switch 5, the timer motor 32 and contacts 44b to the terminal L2, thereby to energize the motor 32 to advance the timer 16 through its cycle. It will be apparent that the switches 4 and 5 and timer motor 32 are in parallel with the switch 1 and timer motor 22. The switch 7 is also connected in series with the switch 3 so that, when the switches 3 and 7 are closed, current can flow from the terminal L1 through the switch 9, switch 7, switch 3, the coil of the solenoid 38 and the contacts 44b, to the terminal L2, thereby to energize the solenoid 38.

It will be appreciated that the push-button switch 8 in parallel with the switch 7 is a "starter switch" in that, when the switch 8 is momentarily closed, the solenoid 38 can be energized if the switch 3 or the switch 6, which is also in series with the switch 8, is closed. Of course, the operation of the switch 3 is determined by the position of the timer 14 and the operation of the switch 6 is determined by the position of the timer 16, the switches 3 and 6 being connected in parallel.

The switch 2 is arranged to energize a solenoid-operated valve, indicated generally by the reference numeral 46 and an indicator light 48 connected in parallel with the coil of the solenoid-operated valve 46. That is, when the switch 2 and the switch 7 are both closed, current can flow from the terminal L1 through the switch 9, switch 7, switch 2, the coil of the solenoid-operated valve 46 and the over-load relay 44 to the terminal L2. The light 48, therefore, indicates that the solenoid-operated valve 46 is energized.

Figure 2:
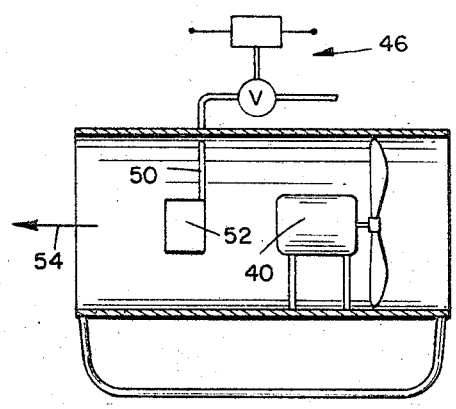
FIG. 2 is a sectional view of a heater and blower system of the type used in grain-drying application.

Referring to FIG. 2, it will be seen that, in the illustrative embodiment, the solenoid-operated valve 46 is connected in a gas line 50 which connects a burner 52 to a fuel tank, not shown. Preferably, when the burner 52 is energized, the blower motor 40 will be energized to direct air in the direction of the arrow 54 past the burner 52. Thus, when the switch 2 is closed to energize the solenoid-operated valve 46, the switches 10 and 11 should be closed to energize the motor 40. This feature is obtained by the fact that the switches 10 and 11 are closed by the solenoid 38 when the switch 7 is closed, and, if the switch 7 is not closed, the solenoid-operated valve 46 cannot be energized.

There is another indicator light 56 connected in parallel with the coil of the solenoid 38 to indicate when the solenoid is energized. It will be apparent, therefore, that the light 48 indicates when the burner 52 is energized and the light 56 indicates when the blower motor 40 is energized.

In grain-drying applications, it is conventional to operate the burner 52 for a first predetermined time while the blower motor 40 is energized and then to deenergize the burner 52 after which the blower motor 40 is maintained energized for a second predetermined time. The time period for operating the burner 52 is established by adjusting the timer 14, i.e., the position of the shaft 20, so that when the timer 14 is energized through the switches 1 and 7, the switch 2 will be closed for a predetermined period of time, thereby to energize the solenoid-operated valve 46 for that period of time. The cam 18 associated with the switch 3 is contoured so that, when the switch 2 is closed, the switch 3 is also closed to maintain the solenoid 38 energized to keep the blower motor 40 energized when the solenoid-operated valve 46 is energized. At the end of the heating cycle, i.e., when the switch 2 is opened to deenergize the solenoid-operated valve 46, the switch 4 is closed to energize and advance the timer 16, motor 32 to start the cooling cycle. Preferably, at the same time that the timer 14 is adjusted, the timer 16 will be adjusted so that the switches 5 and 6 are initially closed and will remain closed for a selected period of time after the timer 16 is energized. The switch 6, when closed, maintains the solenoid 38 energized when the switch 3 opens at the end of the heating cycle. The switches 5 and 6 open when the timer 16 times out to deenergize, respectively, the timer 16 and the solenoid 38.

Preferably, both of the timers 14 and 16 are arranged so that they can be adjusted to a "hold position" in which the solenoid-operated valve 46 and the motor 40 are energized until the switch 9 is operated to deenergize the control system. As a safety feature, in case of a power failure, the entire control system, the motor 40 and the burner 52 are deenergized and will stay deenergized until the starter switch 8 is again operated.

In recapitulation, it will be apparent that the timers 14 and 16 are energized through the switch 7 which is operated by the solenoid 38 which, in turn, is controlled by the operation of the timers 14 and 16. This manner of controlling the operation of a burner and a blower associated with the burner is believed to be extremely safe and practical.

While there have been discussed above the principles of this invention in conjunction with specific apparatus,

What is claimed is:

1. A control system comprising first control means, second control means, first timer means, and second timer means, said first timer means comprising first, second, third and fourth switches, and said second timer means comprising fifth and sixth switches, said first switch being effective to energize and advance said first timer means when said first switch is closed, said second switch being effective to energize said first control means when said second switch is closed, said third switch being effective to energize said second control means when said third switch is closed, said fourth and fifth switches being effective to energize and advance said second timer means when both said fourth and fifth switches are closed, said fourth and fifth switches being in series, said sixth switch being effective to energize said second control means when said sixth switch is closed, and a seventh switch operatively connected to said second control means and arranged to be closed when said second control means is energized, said seventh switch being in series with said first switch to maintain said first timer means energized when both said first and seventh switches are closed, and said seventh switch also being in series with said fourth and fifth switches to maintain said second timer means energized when said fourth, fifth and seventh switches are closed.

2. A control system as in claim 1 wherein said seventh switch is in series with said second switch to maintain said first control means energized when both said second and seventh switches are closed.

3. A control system as in claim 1 wherein said seventh switch is in series with said third switch to maintain said second control means energized when both said third and seventh switches are closed.

4. A control system as in claim 1 wherein said seventh switch is in series with said sixth switch to maintain said second control means energized when both said sixth and seventh switches are closed.

5. A control system as in claim 1 further comprising a normally-open, manually-operable, momentary contact switch connected in parallel with said seventh switch, said momentary contact switch being effective, when operated, to energize said first timer means when said first switch is closed and to energize said second timer means when said fourth and fifth switches are closed.

6. A control system as in claim 1 further comprising a normally-closed, manually-operable switch connected in series with said seventh switch and arranged, when opened, to deenergize said first and second control means and said first and second timer means.

7. A control system as in claim 1 wherein said first control means is a solenoid-operated valve for energizing and deenergizing a burner and said second control means is a solenoid-operated switch means for energizing and deenergizing a blower motor.

8. A control system as in claim 7 further comprising overload relay means connected to said solenoid-operated switch means, said overload relay means being effective, when said blower motor is overloaded, to deenergize said blower motor and said first and second control means.

9. A control system comprising first control means, second control means, first timer means, second timer means, first switch means operated by said second control means, said first switch means being closed when said second control means is energized, first circuit means for connecting one side of said first switch means to one side of an electrical power source, and second circuit means for connecting the other side of said first switch means to said second control means and through said second control means to the other side of such power source, said second circuit means including second switch means and third switch means, said second and third switch means being connected in parallel, said second switch means being actuated by said first timer means and said third switch means being actuated by said second timer means, and fourth switch means actuated by said first timer means and being arranged to connect said first control means between said other side of said first switch means and said other side of such power source, thereby to energize said first control means.

10. A control system as in claim 9 further comprising a normally-open starter switch connected in parallel with said first switch means.

11. A control system as in claim 9 further comprising a normally-closed stop switch connected in said first circuit means.

References Cited

UNITED STATES PATENTS

| | | | |
|---|---|---|---|
| 2,606,372 | 8/1952 | Foulder et al | 34—53 X |
| 3,162,777 | 12/1964 | Weber et al. | 307—141.4 |
| 3,182,212 | 5/1965 | Weber et al. | 307—141.4 |
| 3,361,415 | 1/1968 | Lane | 137—624.11 X |

ROBERT K. SCHAEFER, *Primary Examiner.*

T. B. JOIKE, *Assistant Examiner.*

U.S. Cl. X.R.

34—48, 53; 137—624.11; 219—364, 492; 307—141.8